3,326,911
PROCESS FOR PRODUCING CYANURIC
CHLORIDE
Yutaka Kodama and Toshisuke Sasakura, Toyama-shi, Saburo Takata, Kawaguchi-shi, Masaru Shinjo, Toyama-shi, Masao Nakabayashi, Namerikawa-shi, and Hiroaki Tamura, Toyama-shi, Japan, assignors to Toyama Chemical Industry Co., Ltd., Tokyo, Japan, a corporation of Japan
No Drawing. Filed Dec. 23, 1964, Ser. No. 420,818
18 Claims. (Cl. 260—248)

This invention relates to a catalytic production of cyanuric chloride from cyanogen chloride or a gaseous mixture of hydrogen cyanide and chlorine by bringing it into contact with a novel catalyst. More specifically the present invention provides a process for producing cyanuric chloride which comprises introducing (bubbling) cyanogen chloride or a gaseous mixture of hydrogen cyanide and chlorine into a eutectic mixture of aluminum chloride or/and ferric chloride with one or more alkali metal or alkaline earth metal halides or zinc halide or lead halide at a temperature of 150° to 500° C. in a molten and liquid state (as catalyst).

Up to the present, when cyanogen chloride or hydrogen cyanide and chlorine mixed gas have been directly polymerized to produce cyanuric chloride, in addition to active carbon, chlorides of alkali metals, copper, lead, manganese etc. have been proposed for active catalysts. But these catalysts have difficulties in their preparation and drying, their activities lack uniformity in reproduceability, and further in respect of catalytic action, these catalysts are not satisfactory.

We have been doing research for a catalyst having a higher catalytic activity, and without the above-mentioned weak points and it is an object of this invention to provide such a catalyst. We have already found that the eutectic mixture of aluminum chloride or ferric chloride with halogen compounds of metals belonging to the first or second group of the periodic table has an excellent catalytic activity and shows a sufficient reproduceability in activity, and proved that when it is absorbed on active carbon, silica gel or other common carriers and traversed (in fluidized or fixed bed) by cyanogen chloride or a gaseous mixture of hydrogen cyanide and chlorine at a temperature between 200° and 500° C., cyanuric chloride is produced in a good yield.

However, difficulties in preparation of catalysts, exchange of the same and control of reaction temperature remained an unsolved problem in this step.

Then, in order to eliminate these difficulties and improve the efficiency of the catalyst, we continued the investigation, and reached the conclusion as mentioned above, that is, when the eutectic mixture of aluminum chloride or/and ferric chloride with alkali or alkaline earth metal halide is held at a reaction temperature of 150°–500° C. in a molten and liquid state and cyanogen chloride or a gaseous mixture of hydrogen cyanide and chlorine is bubbled therein, catalytic polymerization in molten salt is easily performed to produce cyanuric chloride in a good yield. Thus we could attain our expected object.

The catalysts of this invention used in molten and liquid state which contain aluminum chloride or/and ferric chloride as main components are as in the following examples:

Eutectic mixtures and their eutectic points:

| | ° C. |
|---|---|
| $AlCl_3 \cdot NaCl$ | 123.6 |
| $AlCl_3 \cdot KBr$ | 213 |
| $AlCl_3 \cdot SrCl_2$ | 300 |
| $FeCl_3 \cdot ZnCl_2$ | 214 |
| $FeCl_3 \cdot PbCl_2$ | 177 |
| $AlCl_3 \cdot CaCl_2NaCl$ | 200 |
| $AlCl_3 \cdot KCl$ | 158 |
| $AlCl_3 \cdot NaF$ | 210 |
| $AlCl_3 \cdot BaCl_2$ | 290 |
| $FeCl_3 \cdot CuCl_2$ | 304 |
| $AlCl_3 \cdot FeCl_3 \cdot NaCl$ | 160–170 |

According to the present method many advantages are obtained in carrying out the reaction: that is (1) a catalyst having homogeneous activity is obtained due to its being a liquid of a low-melting point, (2) the catalyst can be easily exchanged, (3) control of reaction temperature is very simple, for the heat of reaction flows directly into the molten salt, and in addition, (4) the rate of reaction is high enough to carry out the reaction in a very small reactor which reduces remarkably the cost of equipment in the embodiment of this invention, etc.

In the practice of this invention when cyanogen chloride is polymerized under the boiling point of cyanuric chloride the molten salt is maintained at a temperature of 150°–180° C. and then cyanogen chloride is introduced to an amount that the molar ratio of aluminum chloride in eutectic mixture and the introduced cyanogen chloride is for example 1:2 and accumulated cyanuric chloride is expelled by distillation as such, and then cyanogen chloride is introduced, repeating this procedure cyanuric chloride is continually produced. In this case when cyanogen chloride is introduced in an amount greater than 4 mol to the 1 mol of aluminum chloride cyanogen chloride is apt to escape unreacted, and when cyanuric chloride is produced by bubbling the gas mixture of hydrogen cyanide and chlorine into the eutectic salt the conditions are quite the same as the above except that the cyanogen chloride is replaced by hydrogen cyanide-chlorine mixed gas.

And when the reaction is carried out over the boiling point of cyanuric chloride (that is 200°–500° C.) by bubbling of cyanogen chloride or hydrogen cyanide-chlorine mixed gas into the eutectic mixture, cyanuric chloride produced is distilled off, from the reaction system. In this case, it is observed that at the beginning of the reaction, the molten salt increases in its viscosity due to the formation of complex compounds with aluminum chloride or ferric chloride, but later the contained molten salt returns back to the initial viscosity, and cyanuric chloride is distilled out continuously.

It is expected that in the commercial scale production of cyanuric chloride the reaction rate is further improved by better dispersion of cyanogen chloride or hydrogen cyanide-chlorine mixed gas into the molten catalyst.

*Example 1*

70 grams of eutectic mixture consisting of aluminum chloride and sodium chloride in the ratio of 70:30 by weight was put into a 100 ml. saber type Claisen's flask and was heated to melting up to 380°–400° C. Into this molten salt cyanogen chloride was bubbled at the rate of 17.5 g./hr. for 43 hours and 20 minutes. 714 g. cyanuric chloride of 99.1% purity was obtained. Yield was 94%

*Example 2*

78 grams of eutectic mixture consisting of aluminum chloride and potassium chloride in the ratio of 64:36 was put into the same reactor used in Example 1 and heated to melting up to 380°–400° C. When cyanogen chloride was introduced at the rate of 18 g./hr. for 40 hours 662.4 grams cyanuric chloride of 99% purity was obtained. Yield was 92%.

*Example 3*

72 g. of eutectic mixture consisting of aluminum chloride and sodium fluoride in the ratio of 76:24 by weight was put into the same reactor used in Example 1, and was heated to melting up to 380°–400° C. Cyanogen chloride was passed at the ratio of 16 g./hr. for 20 hours. 28.8 g. of cyanuric chloride of 98.9% purity was obtained. Yield 90%.

*Example 4*

70 g. of eutectic mixture consisting of aluminum chloride and sodium chloride in the ratio of 70:30 by weight was put into the same reactor used in Example 1, heated to melting up to 150°–180° C. Cyanogen chloride was bubbled at the ratio of 45 g./hr. for 1 hour. The introduction of cyanogen chloride was stopped, and cyanuric chloride produced was driven out by heating up to 400° C., then cyanogen chloride was newly introduced at a temperature 150°–180° C. Cyanogen chloride was bubbled for 10 hours; repeating this procedure 40.5 g. cyanuric chloride of 99.1% purity was obtained. Yield 90%.

*Example 5*

80 grams of eutectic mixture consisting of aluminum chloride, ferric chloride and sodium chloride in the ratio of 60:10:30 by weight was put into the same reactor used in Example 1, and heated to melting up to 380°–400° C. A mixed gas composed of hydrogen cyanide and chlorine was bubbled through at the ratio of 53 l./hr. and 54 l./hr. respectively for 20 hours. 2625 grams cyanuric chloride of 98.5% purity was obtained. Yield 91%.

*Example 6*

80 g. of eutectic mixture consisting of aluminum chloride, calcium chloride and sodium chloride in the ratio of 65:10:25 by weight was charged into the same reactor used in Example 1, and was heated to melting up to 380°–400° C. Cyanogen chloride was bubbled through at the rate of 16 g./hr. for 10 hours. 144 g. of cyanuric chloride of 98.9% purity was obtained. Yield 90%.

What we claim is:

1. A process for producing cyanuric chloride which comprises bubbling a mixed gas of hydrogen cyanide and chlorine into a molten, liquid eutectic mixture catalyst consisting of at least one member selected from the group consisting of aluminum chloride and ferric chloride, and at least one member selected from the group consisting of alkali metal halides, alkaline earth metal halides, zinc halides and lead halides, at a temperature of from 150° to 500° C.

2. A process accoring to claim 1, wherein the catalyst is a eutectic mixture consisting of aluminum chloride and an alkali metal halide.

3. A process according to claim 2, wherein the alkali metal halide is sodium chloride.

4. A process according to claim 2, wherein the alkali metal halide is potassium chloride.

5. A process according to claim 2, wherein the alkali metal halide is soidum fluoride.

6. A process according to claim 1, wherein the catalyst is a eutectic mixture of consisting of aluminum chloride, ferric chloride and an alkali metal halide.

7. A process according to claim 6, wherein the alkali metal halide is sodium chloride.

8. A process according to claim 1, wherein the catalyst is a eutectic mixture consisting of aluminum chloride, an alkali metal halide and an alkaline earth metal halide.

9. A process according to claim 8, wherein the alkali metal halide is sodium chloride and the alkaline earth metal halide is calcium chloride.

10. A process for producing cyanuric chloride which comprises bubbling cyanogen chloride into a molten, liquid eutectic mixture catalyst consisting of at least one member selected from the group consisting of aluminum chloride and ferric chloride, and at least one member selected from the group consisting of alkali metal halides, alkaline earth metal halides, zinc halides and lead halides, at a temperature of from 150° to 500° C.

11. A process according to claim 10, wherein the catalyst is a eutectic mixture consisting of aluminum chloride and an alkali metal halide.

12. A process according to claim 11, wherein the alkali metal halide is sodium chloride.

13. A process according to claim 11, wherein the alkali metal halide is potassium chloride.

14. A process according to claim 11, wherein the alkali metal halide is sodium fluoride.

15. A process according to claim 10, wherein the catalyst is a eutectic mixture consisting of aluminum chloride, ferric chloride and an alkali metal halide.

16. A process according to claim 15, wherein the alkali metal halide is sodium chloride.

17. A process according to claim 10, wherein the catalyst is a eutectic mixture consisting of aluminum chloride, an alkali metal halide and an alkaline earth metal halide.

18. A process according to claim 17, wherein the alkali metal halide is sodium chloride and the alkaline earth metal halide is calcium chloride.

References Cited

UNITED STATES PATENTS 3,257,399   6/1966   Kodama et al. _____ 260—248

WALTER A. MODANCE, *Primary Examiner.*

JOHN M. FORD, *Assistant Examiner.*